United States Patent [19]

Müller et al.

[11] Patent Number: 4,965,292

[45] Date of Patent: Oct. 23, 1990

[54] PROCESS FOR STRENGTHENING GEOLOGICAL FORMATIONS

[75] Inventors: Hanns P. Müller; Manfred Kapps, both of Bergisch-Gladbach; Peter Vehlewald, Leichlingen; Frank Meyer, Essen; Wolfgang Cornely, Gladbeck; Hans E. Mehesch, Essen, all of Fed. Rep. of Germany

[73] Assignees: Bayer Aktiengesellschaft, Leverkusen; Bergwerksverband GmbH, Essen, both of Fed. Rep. of Germany

[21] Appl. No.: 438,903

[22] Filed: Nov. 17, 1989

Related U.S. Application Data

[63] Continuation of Ser. No. 231,101, Aug. 11, 1988, abandoned.

[30] Foreign Application Priority Data

Aug. 21, 1987 [DE] Fed. Rep. of Germany ....... 3727880

[51] Int. Cl.$^5$ ...................... C08G 18/08; C04B 16/08
[52] U.S. Cl. ........................................ 521/110; 528/48
[58] Field of Search ........................... 521/110; 528/48

[56] References Cited

U.S. PATENT DOCUMENTS

| | | | |
|---|---|---|---|
| 3,061,556 | 10/1962 | Gemeinhardt | 521/110 |
| 3,839,242 | 10/1974 | Huber et al. | 521/110 |
| 4,113,014 | 9/1978 | Kubens et al. | 166/295 |
| 4,114,382 | 9/1978 | Kubens et al. | 405/264 |
| 4,454,252 | 6/1984 | Meyer | 521/110 |
| 4,475,847 | 10/1984 | Cornely et al. | 405/264 |
| 4,554,295 | 11/1985 | Ridge, Jr. | 521/110 |
| 4,715,746 | 12/1987 | Mann et al. | 528/49 |
| 4,760,098 | 7/1988 | Miutel | 521/110 |
| 4,855,379 | 8/1989 | Budnik et al. | 521/110 |

FOREIGN PATENT DOCUMENTS

| | | |
|---|---|---|
| 1758185 | 10/1970 | Fed. Rep. of Germany . |
| 1784458 | 10/1981 | Fed. Rep. of Germany . |
| 51-106198 | 3/1975 | Japan ................................. 521/110 |
| 885762 | 12/1961 | United Kingdom . |

OTHER PUBLICATIONS

Journals Gluckauf, 1968, pp. 666–670.
Journal Gluckauf, 1977, pp. 707–711.
Bergbau, 1977, pp. 124–129.

Primary Examiner—Maurice J. Welsh
Assistant Examiner—Rabon Sergent
Attorney, Agent, or Firm—Joseph C. Gil; Thomas W. Roy

[57] ABSTRACT

The present invention relates to a process for strengthening geological formations in underground mining or underground construction work by the introduction of reaction mixtures which react to form polyurethane plastics into the formations which are required to be strengthened, wherein the reaction mixtures are based on (a) a polyisocyanate component,
(b) a polyol component and
(c) at least one auxiliary agent or additive, characterized in that component (c) contains a cyclic polydimethylsiloxane in the molecular weight range of 222 to 740 and in a quantity of about 0.01 to 5.0% by weight, based on the total weight of components (a) and (b).

6 Claims, No Drawings

PROCESS FOR STRENGTHENING GEOLOGICAL FORMATIONS

This application is a continuation of application Ser. No. 07/231,101 filed Aug. 11, 1988, now abandoned.

BACKGROUND OF THE INVENTION

1. Field of the Invention

This invention relates to a new process for strengthening geological formations in underground mines or underground constructions using reaction mixtures based on organic polyisocyanates and polyhydroxyl compounds which also contain special cyclic polysiloxanes as compounds for regulating the foaming process.

2. Description of the Prior Art

The method of strengthening geological formations below ground, in particular in coal mines, by means of polyurethane-forming foams which harden inside the formation is already known (see, for example the Journals Glückauf (1968), pages 666 to 670; Glückauff (1977), pages 707 to 711; and Bergbau (1977), pages 124 to 129, and DE-PS Nos. 1,129,894, 1,758,185, 1,784,458, 2,436,029, 2,623,346 and 3,139,395). Mixtures which react to form polyurethanes are also used for sealing off against water and/or gases.

In this process, which is to be regarded as state of the art, the following procedure is generally adopted. The two components of the reaction, the polyisocyanate and the polyalcohol (polyhydroxyl component), are transported separately to a position in front of a bore hole, where they are combined continuously in a static mixer and forced under pressure through the bore hole into the rock formation where the mixture foams up and hardens.

Geological formations which are to be strengthened on this principle, in particular layers of rock below ground, vary considerably in their water content. This means that when reaction mixtures based on the polyisocyanates and the polyether polyols known from polyurethane chemistry are used, the polyisocyanate component reacts in an uncontrolled manner with the water present in the formation, especially in rock layers which have a high water content, to give rise to lightweight polyurea foams which do not always provide sufficient strengthening of the rock formation. Homogeneous and adequate strengthening of the rock formation can only be ensured if controlled and homogeneous foaming takes place to a large extent independently of the water content of the formation. The properties of the resulting foams should be predeterminable by suitable choice of the composition of the reaction mixture, regardless of the water content of the formation. It has been found in the past that the addition of castor oil to the conventional polyether polyols in the polyol component is a first step in this direction. The castor oil, which is generally added in quantities of 5 to 20% by weight, based on the polyol component, reduces the tendency of unwanted side reactions between the polyisocyanate and water so that excessive foaming of the polyurethane resin, in particular in contact with the water present in the formation, and the resulting weakening of the mechanical properties are avoided.

However, castor oil has the disadvantage that it is a naturally occurring product and therefore subject to considerable fluctuations in its properties. Further, since castor oil must be used in the large quantities mentioned above, it constitutes a major cost factor and the price of this natural product is subject to considerable fluctuations and on average is considerably above the cost of conventional polyether polyols.

It was therefore an object of the present invention to provide a new process for strengthening geological formations which is not dependent on the use of castor oil and which ensures the advantages obtained with castor oil.

This problem was solved by the process according to the invention described below, in which certain cyclic polydimethylsiloxanes are used. It was surprisingly found that by adding this auxiliary agent it was possible not only to improve on the advantages obtained with castor oil but also to substantially improve the mechanical properties of the polyurethane plastics. One of the main effects of adding these cyclic polydimethylsiloxanes is to prevent the formation of lightweight, i.e. highly expanded foams even in layers of rock which have a high water content, so that uniformly expanded polyurethane plastics with excellent mechanical properties are obtained by the process according to the invention.

The fact that cyclic polydimethylsiloxanes prevent the formation of highly expanded foams is surprising since it is known from polyurethane chemistry that (linear) polydimethylsiloxanes and polyether polysiloxanes are foam stabilizers and, therefore, have exactly the opposite effect.

SUMMARY OF THE INVENTION

The present invention relates to a process for strengthening geological formations in underground mining or underground construction work by the introduction of reaction mixtures which react to form polyurethane plastics into the formations which are required to be strengthened, wherein the reaction mixtures are based on (a) a polyisocyanate component,
(b) a polyol component and
(c) at least one auxiliary agent or additive, characterized in that component (c) contains a cyclic polydimethylsiloxane in the molecular weight range of 222 to 740 and in a quantity of about 0.01 to 5.0% by weight, based on the total weight of components (a) and (b).

DETAILED DESCRIPTION OF THE INVENTION

Polyisocyanate component (a) to be used in the process according to the invention is preferably based on polyphenyl polymethylene polyisocyanates of the type which may be prepared by the aniline/formaldehyde condensation followed by phosgenation ("polymeric MDI") or derivatives of these polyisocyanates which are liquid at room temperature and contain carbodiimide, biuret, urethane and/or allophanate groups. More preferred are liquid polymeric MDI and liquid reaction products of polymeric MDI containing isocyanate groups and obtained by their reaction with subequivalent quantities (NCO/OH equivalent ratio of about 1:0.005 to 1:0.3) of polyhydric alcohols in the molecular weight range of 62 to about 3000, in particular ether group-containing polyols in the molecular weight range of 106 to about 3000. Mixtures of 2,4'- and 4,4'-diisocyanatodiphenyl methane which are liquid at room temperature are also suitable as polyisocyanate component (a). According to the invention, other organic polyisocyanates may be used, e.g. those disclosed in DE-OS No. 2,832,253 (U.S. Pat. No. 4,263,408, herein incorporated by reference in its entirety). Polyisocyanate mixtures of the diphenyl methane series having a viscosity at 25° C. of about 50 to 500 mPa.s and an isocyanate content of about 30 to 33% by weight are particularly preferred.

Polyol component (b) is based on organic polyhydroxyl compounds or mixtures of organic polyhydroxyl compounds having an (average) OH number of about 100 to 800, preferably about 250 to 400.

Polyol component (b) is preferably based on the polyether polyols known from polyurethane chemistry or mixtures of various types of such polyether polyols. When mixtures of different polyhydroxyl compounds are used, the figures given above for the hydroxyl number apply to these mixtures. This means that individual components of the mixtures may have a hydroxyl number outside the ranges stated. Examples of suitable polyether polyols are the propoxylation products and/or ethoxylation products obtained from starter molecules having functionalities of 2 to 8 such as water, 1,2-dihydroxy propane, trimethylol propane, pentaerythritol, glycerol, sorbitol, ethylene diamine and also sugars. Component (b) preferably has an average hydroxyl functionality of about 2.0 to 5.0, preferably about 2.0 to 3. Suitable mixtures may be obtained, for example, by subjecting mixtures of starter molecules of the type exemplified above to an alkoxylation reaction. Suitable components (b) for the purpose of the invention may also be obtained by mixing separately prepared polyhydroxy polyethers.

The addition of polydimethylsiloxanes, optionally together with other auxiliary agents and additives (c), is an essential feature of this invention.

Suitable polydimethylsiloxanes include any cyclic polydimethylsiloxanes or mixtures thereof, such as those obtained commercially by the controlled hydrolysis of dimethyl-dichlorosilane. Compounds of this type in the molecular weight range of 222 to 740 corresponding to the following formula are mentioned as examples:

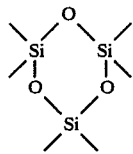

Mol. wt. 222

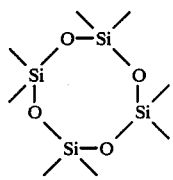

296

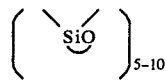

370–740

Octamethylcyclotetrasiloxane is particularly preferred.

The cyclic polydimethylsiloxanes are used in a quantity of about 0.01 to 5.0% by weight, preferably about 0.05 to 2.5% by weight, based on the total weight of components (a) and (b). They may be incorporated either with polyisocyanate component (a) or with polyol component (b) before the reaction mixture is prepared.

The following are examples of auxiliary agents and additives (c) which may optionally be used:
(1) water, which may be added in a quantity of up to about 5% by weight, preferably up to about 4% by weight, based on the weight of component (b) and
(2) catalysts for the isocyanate addition reaction, in particular organic tin compounds such as tin(II) octoate or dibutyl tin dilaurate or tertiary amines such as N,N-dimethylbenzylamine or triethylene diamine. These catalysts may be used in a quantity of up to about 2% by weight, preferably a quantity of about 0.3 to 1% by weight, based on the total mixture.

The following are further examples of optional auxiliary agents and additives:
(3) flame retardants (e.g. phosphoric acid derivatives),
(4) low molecular weight alkane polyols having hydroxyl numbers below 800, e.g. ethylene glycol, propylene glycol and/or trimethylol propane,
(5) castor oil and
(6) organic and inorganic fillers (e.g. urea, calcium carbonate, mica or talc).

Although the cyclic polydimethylsiloxanes may be incorporated with both the polyol component and the polyisocyanate component, the other optional auxiliary agents and additives are generally combined with the polyol component before the process according to the invention is carried out.

For the process according to the invention, the starting components are mixed together in quantities which correspond to an isocyanate index of about 90 to 150, preferably about 120 to 140. By "isocyanate index" is meant the quotient of the number of isocyanate groups present in the reaction mixture divided by the number of isocyanate reactive groups present in the reaction mixture, multiplied by 100; water is considered a difunctional compound.

To carry out the process according to the invention, the cyclic polydimethylsiloxanes are incorporated, as already mentioned, either with polyisocyanate component (a) or with polyol component (b) and the optional addition auxiliary agents and additives (c) are incorporated with the polyol component (b). Components (a) and (b) are then subjected to a vigorous mixing process which may be carried out by means of mixing apparatus known in the art.

The process according to the invention is in other respects carried out by known methods used in the art. A plurality of holes about 20 to 80 mm in diameter are drilled to a depth of about 2 to 6 m into the formations which are to be strengthened, and the mixtures according to the invention are then introduced through these bore holes. The bore holes are generally sealed by an apparatus which has a passage through which the reaction mixture can be injected from a pipe and a non-return valve in the passage preventing spillage of the reaction mixture after it has been injected. Injection may be carried out at pressures of up to about 100 bar or more, but extremely high pressures may cause a break out of coal or rock.

The process according to the invention may be carried out using the process disclosed in U.S. Pat. No. 3,698,196, wherein the polyisocyanate component (a) and the polyol component (b) are introduced into the chambers of a 2-chamber cartridge in proportions corresponding to the above mentioned isocyanate index. The cartridges are then introduced into the previously prepared bore hole and mechanically crushed to enable the two components to mix. The bore hole is then sealed after destruction of the cartridges. In this variation, the cyclic polydimethylsiloxanes may also be added to either the polyisocyanate component or to the polyol component, while the other optional auxiliary agents and additives are added to the polyol component. The 2-chamber cartridge process, however, is less preferred than the first mentioned process.

After the liquid reaction mixture has been introduced into the geological formation and the bore hole has been closed, the mixture, which advantageously hardens as it foams, penetrates the formations (which are to be strengthened) under its own foaming pressure and at the same time completely fills the bore hole. The resulting polyurethane plastics, in particular foams, permanently strengthen the geological formation by virtue of their excellent adherence to the coal or rock and their excellent mechanical properties.

As a result of the addition of cyclic dimethylsiloxanes, the carbon dioxide produced in the reaction with water initially escapes so that the desired foaming and formation of the ultimate, uniform, preferably coarse foam structure only takes place in the final phase of the reaction.

If the process were carried out without the essential additives of the invention, foaming would begin during the initial phase of the reaction so that foam structures with a non-homogeneous density distribution would be produced. These structures would contain large zones of insufficient density and therefore poor mechanical properties. When foaming takes place in the later stages of the reaction, such undesirable variations in the density of the foams no longer occur such that the resulting foams have a homogeneous density and therefore homogeneous mechanical properties. The cyclic polydimethylsiloxanes according to the invention are found to be much more effective in this respect than castor oil which has previously been used for the same purpose. The use according to the invention of cyclic polydimethylsiloxanes has the further advantage that the viscosity of the polyol component (b) used for the process is lower than a corresponding polyol component which does not contain cyclic polydimethylsiloxanes. The ability of the reaction mixture to penetrate fine cracks in the formation to be strengthened is thereby improved.

The following examples serve to illustrate the process according to the invention. All percentages are percentages by weight.

EXAMPLES

The following starting components were used in the examples.

Polyether polyol I—prepared from propylene oxide and a mixture of saccharose and 1,2-propane diol in a molar ratio of 1:5, having an OH number of 380 and a viscosity of 580 mPas at 25° C.

Polyether polyol II—prepared from glycerol and propyleneoxide, having an OH number of 380 and a viscosity of 450 mPas at 25° C.

Polyether polyol III—prepared from 1,2-propane diol and propyleneoxide, having an OH number of 110 and a viscosity of 105 mPas at 25° C.

Polyether polyol IV—prepared from 1,2-propane diol and propyleneoxide, having an OH number of 284 and a viscosity of 75 mPas at 25° C.

Polyether polyol V—prepared from trimethylol propane and ethyleneoxide, having an OH number of 550 and a viscosity of 660 mPas at 25° C.

Polyether polyol VI—prepared from trimethylol propane propyleneoxide and ethyleneoxide, (in proportions of 3:97) having an OH number of 250 and a viscosity of 280 mPas at 25° C.

Castor Oil I—first pressing, iodine number 87.2, OH number 158, water content 0.14%, viscosity 678 mPas at 25° C.

Cyclosiloxane—a commercial mixture containing about 90% of octamethyl-cyclotetrasiloxane, about 3% of hexamethyl-cyclotrisiloxane and about 7% of relatively high molecular weight cyclodimethylsiloxanes.

Polymeric MDI—an isocyanate obtained by the phosgenation of an aniline-formaldehyde condensate, containing 50% of diisocyanatophenyl methane, having an isocyanate content of 33% by weight and a viscosity of 140 mPas at 25° C.

In Examples 1 to 4, three parallel experiments were carried out in each example, differing from one another in the quantity of water introduced. It is clear in Examples 3 and 4, which are according to the invention, that an increase in the quantity of water from 3.0 g to 5.0 g produces virtually no increase in expansion in contrast to the comparison examples, in particular Example 1 (Comparison Example A). This demonstrates that the systems of Example 3 according to the invention are virtually unaffected in their foaming properties by an excess of water.

EXAMPLE 1

Comparison Example A 99 g of the polyol mixture were mixed with the given quantity of water in an unwaxed cardboard cup and then intimately mixed with 120 g of polymeric MDI by manual stirring with a flat wooden rod for 60 seconds. The resulting mixture was poured into a vertically suspended tube of polyamide film (circumference 134 mm) which was closed at the bottom. The height to which the liquid reaction mixture fills the tube prior to any evolution of gas is taken as 1 and serves as reference for the expansion subsequently observed. The expansion is expressed as a multiple of the filling height and is referred to as the "foaming factor." An increase in volume of 100% is thus equal to a foaming factor of 2.0.

| Polyol mixture: | polyether polyol I | 70.7 g |
| --- | --- | --- |
| | polyether polyol IV | 28.3 g |
| Water: | | 1.0 g/3.0 g/5.0 g |
| Foaming factors: | | 4.5/7.5/10.8. |

The foam in each case floated to the top and clearly separated from a less strongly foamed face underneath it (change in gross density). Experience has shown that such effects are an indication of insufficient firmness due to a lack of density in the upper region. Such formulations fail when used underground.

EXAMPLE 2

Comparison Example B

The procedure was as described in Example 1.

| Polyol mixture: | Polyether polyol I | 63.9 g |
| --- | --- | --- |
| | Polyether polyol IV | 25.5 g |
| | Castor oil I | 9.6 g |
| Water: | | 1.0 g/3.0 g/5.0 g |
| Foaming factors: | | 2.5/3.5/8.8 |

EXAMPLE 3

According to the Invention

The procedure was as described in Example 1.

| Polyol mixture: | Polyether polyol I | 69.5 g |
| --- | --- | --- |
| | Polyether polyol IV | 28.5 g |
| | Cyclosiloxane | 1.0 g |
| Water: | | 1.0 g/3.0 g/5.0 g |
| Foaming factors: | | 1.7/4.0/4.0 |

The foam reaction product was uniformly expanded. There was no sign of any change in gross density.

EXAMPLE 4

10 g of water and 10 g of cyclosiloxane were added to 980 g of the polyether polyol mixture of Example 3 and the components were mixed together with stirring for 30 minutes. A homogeneous, clear solution was obtained, which was suitable as a polyether formulation for strengthening geological formations.

Polyether polyols I to VI or mixtures thereof may be used instead of the polyether polyol mixture of Example 3.

EXAMPLE 5

10 g of cyclosiloxane were added to 990 g of polymeric MDI and the components were mixed by stirring for 30 minutes. After an initial incompatibility, a homogeneous, clear solution was obtained which was also suitable for use as the polyisocyanate component for strengthening geological formations.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for strengthening geological formations in underground mines or underground constructions which comprises introducing into the formations to be strengthened, a reaction mixture which reacts to form polyurethane plastics and comprises
   (a) a polyisocyanate component,
   (b) a polyol component and
   (c) about 0.01 to 5% by weight, based on the total weight of components (a) and (b), of a cyclic polydimethylsiloxane having a molecular weight of about 222 to 740.

2. The process of claim 1 which comprises adding said cyclic polydimethylsiloxane to the polyisocyanate component before the reaction mixture is prepared.

3. The process of claim 1 which comprises adding said polydimethylsiloxane to component (b) before the reaction mixture is prepared.

4. The process of claim 1 wherein said polyisocyanate component comprises polymeric MDI.

5. The process of claim 1 wherein said polyol component comprises a polyether polyol.

6. The process of claim 4 wherein said polyol component comprises a polyether polyol.

* * * * *